(12) United States Patent
Nakao

(10) Patent No.: US 9,258,444 B2
(45) Date of Patent: Feb. 9, 2016

(54) DISPLAYING DEVICE HAVING TOUCH PANEL TYPE DISPLAYING UNIT

(71) Applicant: Konica Minolta, Inc., Chiyoda-ku (JP)

(72) Inventor: Takehisa Nakao, Toyokawa (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 14/473,409

(22) Filed: Aug. 29, 2014

(65) Prior Publication Data

US 2015/0062638 A1  Mar. 5, 2015

(30) Foreign Application Priority Data

Aug. 30, 2013  (JP) ................................ 2013-179353

(51) Int. Cl.
| | |
|---|---|
| *G06F 3/12* | (2006.01) |
| *H04N 1/00* | (2006.01) |
| *H04N 1/387* | (2006.01) |
| *G06F 3/0488* | (2013.01) |
| *G06F 3/0484* | (2013.01) |

(52) U.S. Cl.
CPC ....... *H04N 1/00469* (2013.01); *H04N 1/00392* (2013.01); *H04N 1/00411* (2013.01); *H04N 1/00453* (2013.01); *H04N 1/00456* (2013.01); *H04N 1/00461* (2013.01); *H04N 1/00482* (2013.01); *H04N 1/387* (2013.01); *G06F 3/0484* (2013.01); *G06F 3/0488* (2013.01); *G06F 2203/04808* (2013.01); *H04N 1/00381* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 2006/0250630 A1 | 11/2006 | Mori | |
| 2011/0154268 A1* | 6/2011 | Trent et al. | 715/863 |
| 2011/0157636 A1 | 6/2011 | Maeda | |
| 2013/0033717 A1 | 2/2013 | Matsumoto et al. | |
| 2013/0120768 A1* | 5/2013 | Yamada | 358/1.6 |
| 2014/0153060 A1* | 6/2014 | Takahashi | 358/468 |

FOREIGN PATENT DOCUMENTS

| | | |
|---|---|---|
| JP | 2006-277057 A | 10/2006 |
| JP | 2011-138237 A | 7/2011 |
| JP | 2013-020300 A | 1/2013 |
| JP | 2013-037396 A | 2/2013 |
| JP | 2013-103476 A | 5/2013 |

OTHER PUBLICATIONS

Office Action issued by the Japanese Patent Office on Aug. 11, 2015 in corresponding Japanese Application No. 2013-179353, and English language translation of Office Action (10 pages).

* cited by examiner

*Primary Examiner* — Miya J Cato
(74) *Attorney, Agent, or Firm* — Buchanan Ingersoll & Rooney PC

(57) ABSTRACT

An image forming apparatus, as a displaying device, displays the 2nd printing page out of a plurality of printing pages on an operation panel when the 1st to 10th images were allocated to each of the printing pages. The image forming apparatus maintains an allocation state of the 1st printing page anterior to the 2nd printing page and changes an allocation state of at least one of images corresponds to the contact points with the operation panel, when the image forming apparatus receives a gesture operation moves the contact points. The starting points of the contact points are in the 2nd printing page displayed on the operation panel.

11 Claims, 15 Drawing Sheets

DISPLAYING DEVICE HAVING TOUCH PANEL TYPE DISPLAYING UNIT

This application is based on Japanese Patent Application No. 2013-179353 filed with the Japan Patent Office on Aug. 30, 2013, the entire content of which is hereby incorporated by reference.

BACKGROUND OF THE INVENTION

1. Field of the Invention

This invention relates to a displaying device having a touch panel type displaying unit. More specifically, this invention relates to a displaying device for displaying a printing page to which images are allocated.

2. Description of the Related Art

An electrophotography image forming apparatus includes a MFP (Multi Function Peripheral), a facsimile device, a copying machine, a printer, and so on. The MFP has a scanner function, a facsimile function, a copying function, a function as a printer, a data transmitting function, and a server function.

A conventional image forming apparatus has a preview function for previously checking the result of the printing. According to this function, a conventional image forming apparatus displays the images of the documents read by a scanner, etc. simulating the printing result (as preview images) on a display unit, etc. of an operation panel of the image forming apparatus. The user can simply check the direction of the documents, the image size, and so on.

Some conventional image forming apparatuses have a touch panel type operation panel. The user can instinctively operate such an image forming apparatus by performing a touch operation and a gesture operation to the display unit of the operation panel.

The documents 1 and 2 below disclose the processes to be executed when the image forming apparatus is displaying a preview image on a display unit of an operation panel and receives a gesture operation by a user. Document 1 below discloses an information processing device changes a setting of the N in 1 printing to the 2N in 1 printing (N is the natural number) when the images of the first and the second pages generated under the setting of the N in 1 printing are placed with space between them, the user carried out a drag operation for moving the page image of the second page to a position aligned with the page image of the first page, and the user carried out a drop operation.

Document 2 below discloses an image processing device having a recognition unit for recognizing a track of coordinate information input by the user via an operation unit as a gesture, and a setting unit configures the settings for processing image data according to the gesture recognized by the recognition unit. The setting unit configures the different settings (for example, settings of a stapling position, 2 in 1, and so on) based on a position of the gesture.

Document 1: Japan Patent Publication No. 2006-277057
Document 2: Japan Patent Publication No. 2011-138237

Image forming apparatus usually reduces all the images in a file at a constant magnification ratio and allocates the same number of images to each page when receiving a setting of the N in 1 printing as a print setting of a file.

The user checks the preview images of a file under the setting of the N in 1 printing and may discover problems, for example the characters in a particular image in the file is too small and hard to read. In this case, the user hopes to change the size and/or the orientation of the particular image, maintaining the size and/or the orientation of the other images in the file. However, a conventional image forming apparatus reduces all the images in the file at the constant magnification ratio and allocates all the images in the file in the same direction to printing pages. The user can not change the allocation state of a particular printing page partially. Hence, the convenience was hampered.

SUMMARY OF THE INVENTION

The object of this invention is to provide a displaying device which improves the convenience.

An displaying device according to an aspect of the present invention comprises: a display unit which is a touch panel type; and a processor; wherein the processor is configured to: allocate images to each of a plurality of printing pages; display a certain printing page among the printing pages on the display unit when the images are allocated; receive a gesture operation which moves a plurality of contact points with the display unit, starting points of the contact points are in the certain printing page displayed on the display unit; and change an allocation state of at least one of the images corresponds to the contact points, maintaining an allocation state of another printing page anterior to the certain printing page when the gesture operation is received.

A method of controlling a displaying device having a display unit which is a touch panel type, according to another aspect of the present invention comprises: allocating images to each of a plurality of printing pages; displaying a certain printing page among the printing pages on the display unit when the images are allocated; receiving a gesture operation which moves a plurality of contact points with the display unit, starting points of the contact points are in the certain printing page displayed on the display unit; and changing an allocation state of at least one of the images corresponds to the contact points, maintaining an allocation state of another printing page anterior to the certain printing page when the gesture operation is received.

A non-transitory computer-readable recording medium encoded with a control program for a displaying device having a display unit which is a touch panel type, according to still other aspect of the present invention, the control program causing a computer to execute: allocating images to each of a plurality of printing pages; displaying a certain printing page among the printing pages on the display unit when the images are allocated; receiving a gesture operation which moves a plurality of contact points with the display unit, starting points of the contact points are in the certain printing page displayed on the display unit; and changing an allocation state of at least one of the images corresponds to the contact points, maintaining an allocation state of another printing page anterior to the certain printing page when the gesture operation is received.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

The embodiments of this invention will be explained in the followings based on the drawings.

In the embodiments below, an image forming apparatus as a displaying device will be explained. The image forming apparatus forms images using an electrophotographic method, an electrostatic recording method, and so on. The image forming apparatus may be a MFP, a facsimile device, a copying machine, a printer, or the like. The displaying device is able to display preview images. The displaying device may be an image forming apparatus, a scanner, a cellular phone, a tablet PC (Personal Computer), or the like.

In this Description, changing of an allocation state of a printing page means changing at least one of the number of images (the number of images except for blank images) allocated to a printing page, the image type, and the image size. Maintenance of the allocation state of a printing page means maintenance of the number of images (the number of images except for blank images) allocated to a printing page, the image type, and the image size. The N in 1 printing means the printing for allocating N images to each of printing pages (N is the natural number). A gesture operation means an operation for moving at least one contact point with a display unit. The gesture operation includes a rotation operation, a pinch-in operation, a pinch-out operation, a drag operation, or the like.

[Structure of the Image Forming Apparatus]

Firstly, the structure of the image forming apparatus in this embodiment will be explained.

Figure 1:
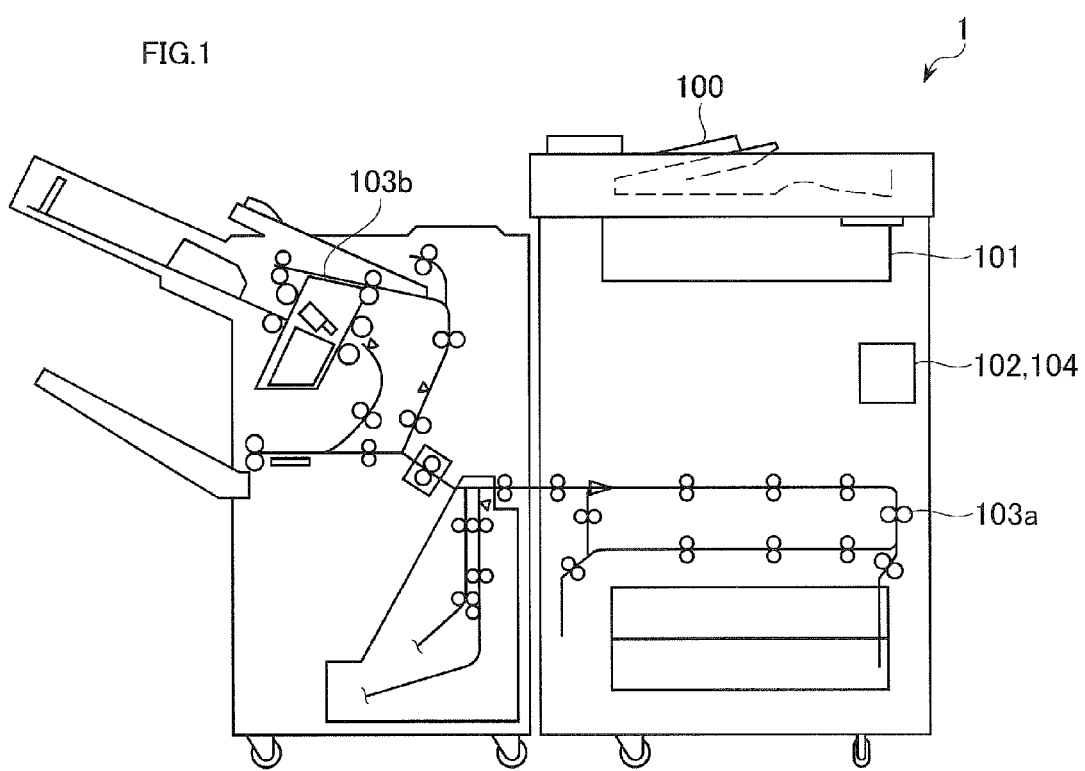
FIG. 1 shows a partial cross section view of a structure of an image forming apparatus in an embodiment of this invention.
Figure 2:
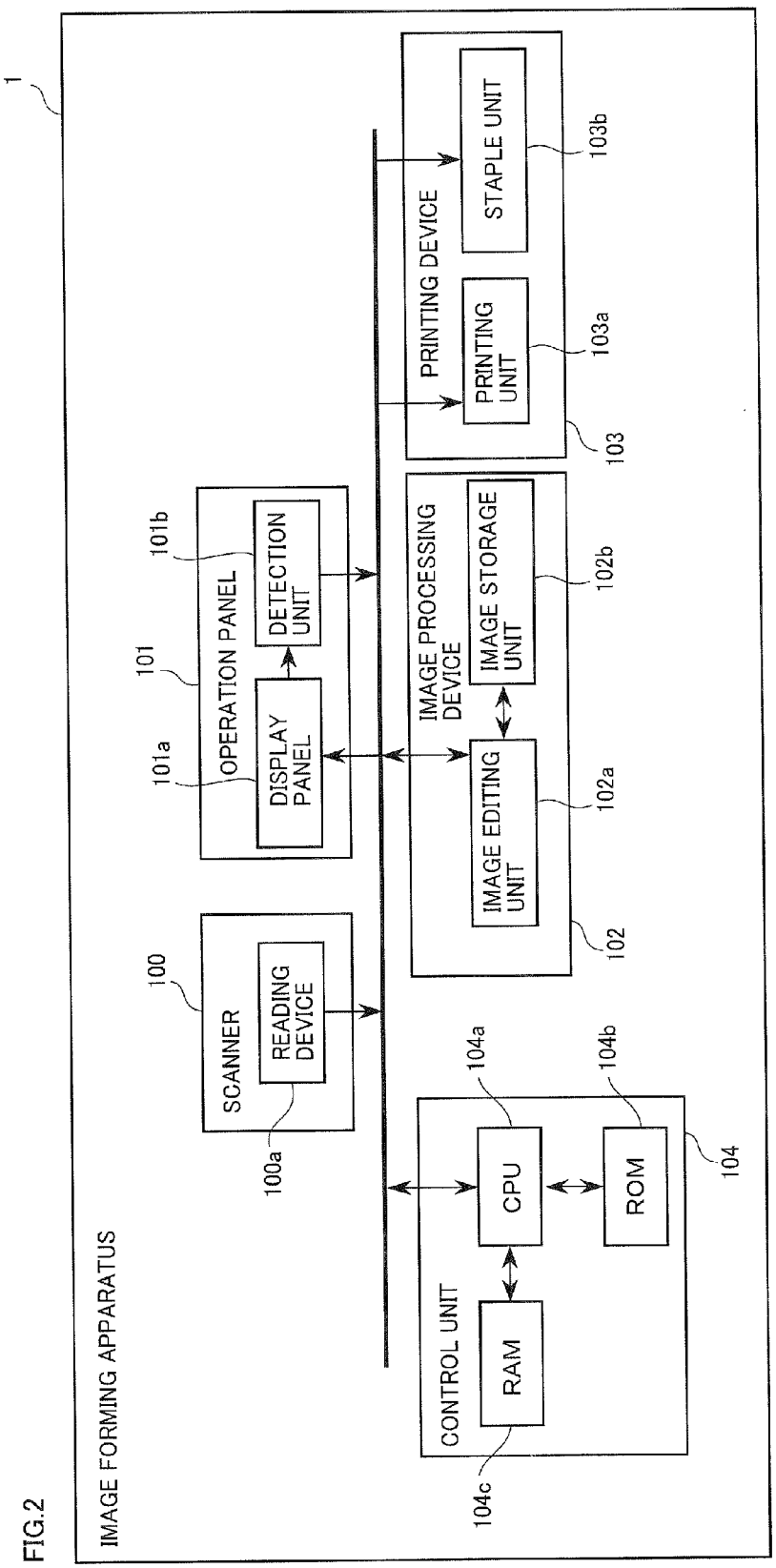
FIG. 2 shows a block diagram of a structure of the image forming apparatus in the embodiment of this invention.

Referring to FIGS. 1 and 2, image forming apparatus 1 (an example of a displaying device) in this embodiment is a MFP. The MFP has a scanner device 100, an operation panel (an example of a display unit, a touch panel operation unit) 101, image processing device 102, a printing device 103, and a control unit 104. A scanner device 100, an operation panel 101, image processing device 102, a printing device 103, and a control unit 104 connect with each other via a bus.

Image forming apparatus 1 is equipped with scanner device 100 on the top of the main body. Scanner device 100 includes a reading device 100a. Scanner device 100 reads images of the documents using reading device 100a and transmits files of images read to image processing device 102, etc.

An operation panel 101 is mounted below scanner device 100 of the main body of image forming apparatus 1. Operation panel 101 is a touch panel and includes a display panel 101a and a detection unit 101b. Display panel 101a displays various information such as an operation screen, etc. Detection unit 101b detects a touch operation and a gesture operation to display panel 101a by a user, and pressing of various hardware keys of operation panel 101.

Image processing device 102 is mounted in the main body of image forming apparatus 1. Image processing device 102 includes image editing unit 102a and image storage unit 102b. Image editing unit 102a edits image files read by reading device 100a based on settings of printing or the like set by a user. Image storage unit 102b (a memory) may be a hard disk device. Image storage unit 102b temporarily stores various kind of information such like image files read by reading device 100a and image files edited by image editing unit 102a.

Printing device 103 includes a printing unit 103a and a staple unit 103b. Printing unit 103a is mounted in the main body of image forming apparatus 1. Printing unit 103a prints images edited by image editing unit 102a on sheets of paper. Staple unit 103b is mounted on the left side of the main body of image forming apparatus 1 as shown in FIG. 1. Staple unit 103b executes post handling processes such as a stapling on sheets of paper printed by printing unit 103a.

Control unit 104 is mounted in the main body of image forming apparatus 1. Control unit 104 includes a CPU (Central Processing Unit) 104a, ROM (Read Only Memory) 104b, RAM (Random Access Memory) 104c, or the like. CPU 104a panoptically controls behavior of the parts of image forming apparatus 1. ROM 104b stores control programs for controlling behavior of image forming apparatus 1. RAM 104c is a working memory for CPU 104a.

Figure 3:
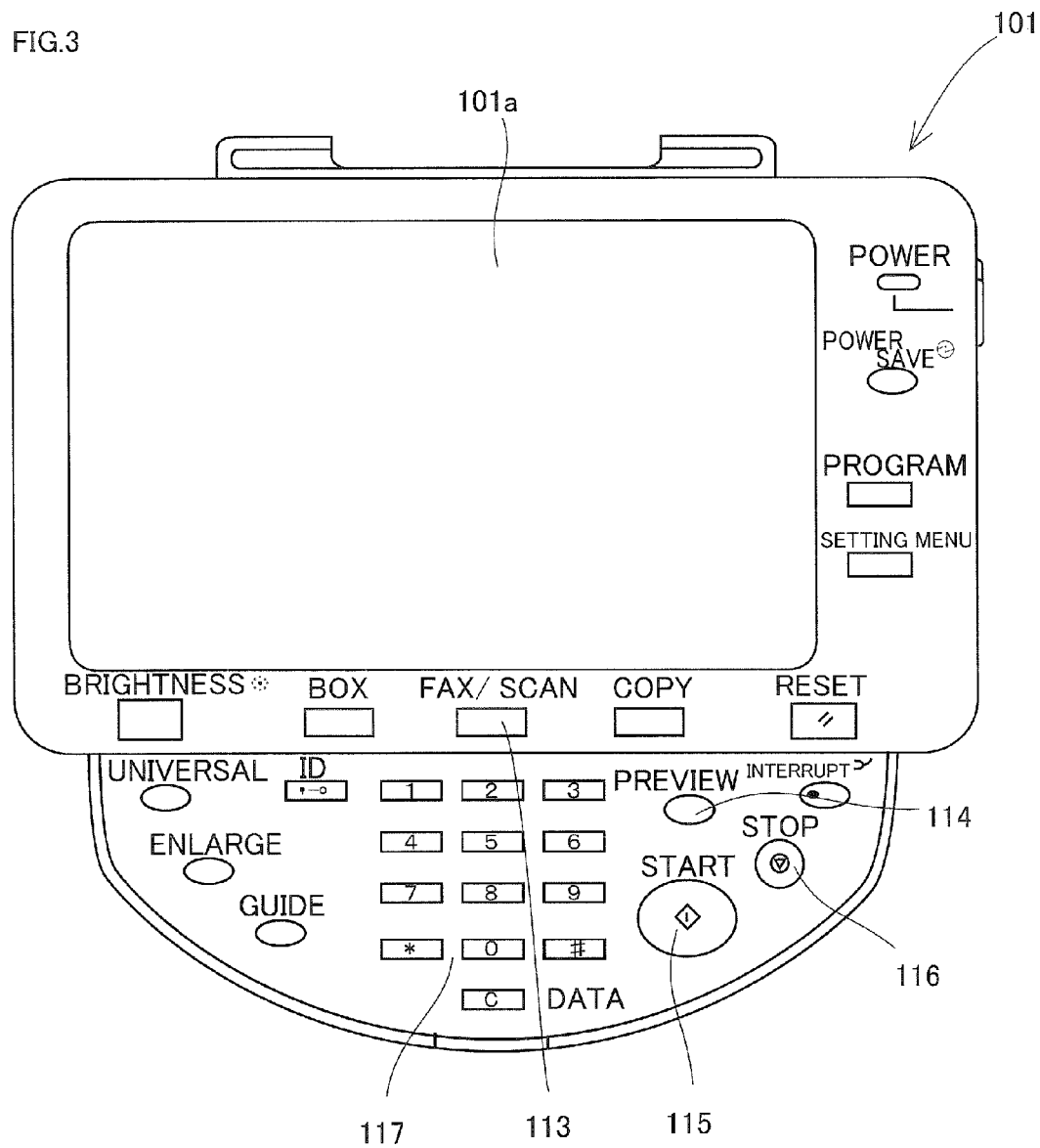
FIG. 3 shows a broad overview of an operation panel 101 as shown in FIG. 1.

FIG. 3 shows a broad overview of an operation panel 101 as shown in FIG. 1.

Referring to FIG. 3, operation panel 101 includes a display panel 101a, facsimile/scan key 113, preview key 114, start key 115, stop key 116, a numerical keypad 117, and so on. Facsimile/scan key 113 is pushed when a facsimile function or a scan function of image forming apparatus 1 is used. Preview key 114a is pushed when setting of a preview function. Start key 115 is for receiving job execute instructions of various functions. Stop key 116 is for receiving an instruction for stopping executing jobs. Numerical keypad 117 is to input various kinds of numbers.

[Behavior of the Image Forming Apparatus]

Next, the behavior (an editing method of images) of image forming apparatus 1 for which the N in 1 printing is set when displaying preview images of a file on operation panel 101 will be explained. Here, the behavior of the image forming apparatus when displaying preview images on operation panel 101 and receiving the first to ninth operations will be explained in series.

Image forming apparatus 1 reads images of documents and temporarily stores the image file read in a memory when documents are set at scanner device 100 and image forming apparatus 1 receives an instruction of execution of a scan job. Image forming apparatus 1 reads the file in the memory, allocates (aggregates) N images of the file to each printing page and stores the file consists of printing pages to which images are allocated in the memory when receiving a setting of the N in 1 printing to the file stored in the memory. Image forming apparatus 1 reads the file stored in the memory and displays preview images of printing pages to which images are allocated on operation panel 101 when receiving an instruction of the preview display of the file.

Figure 4:
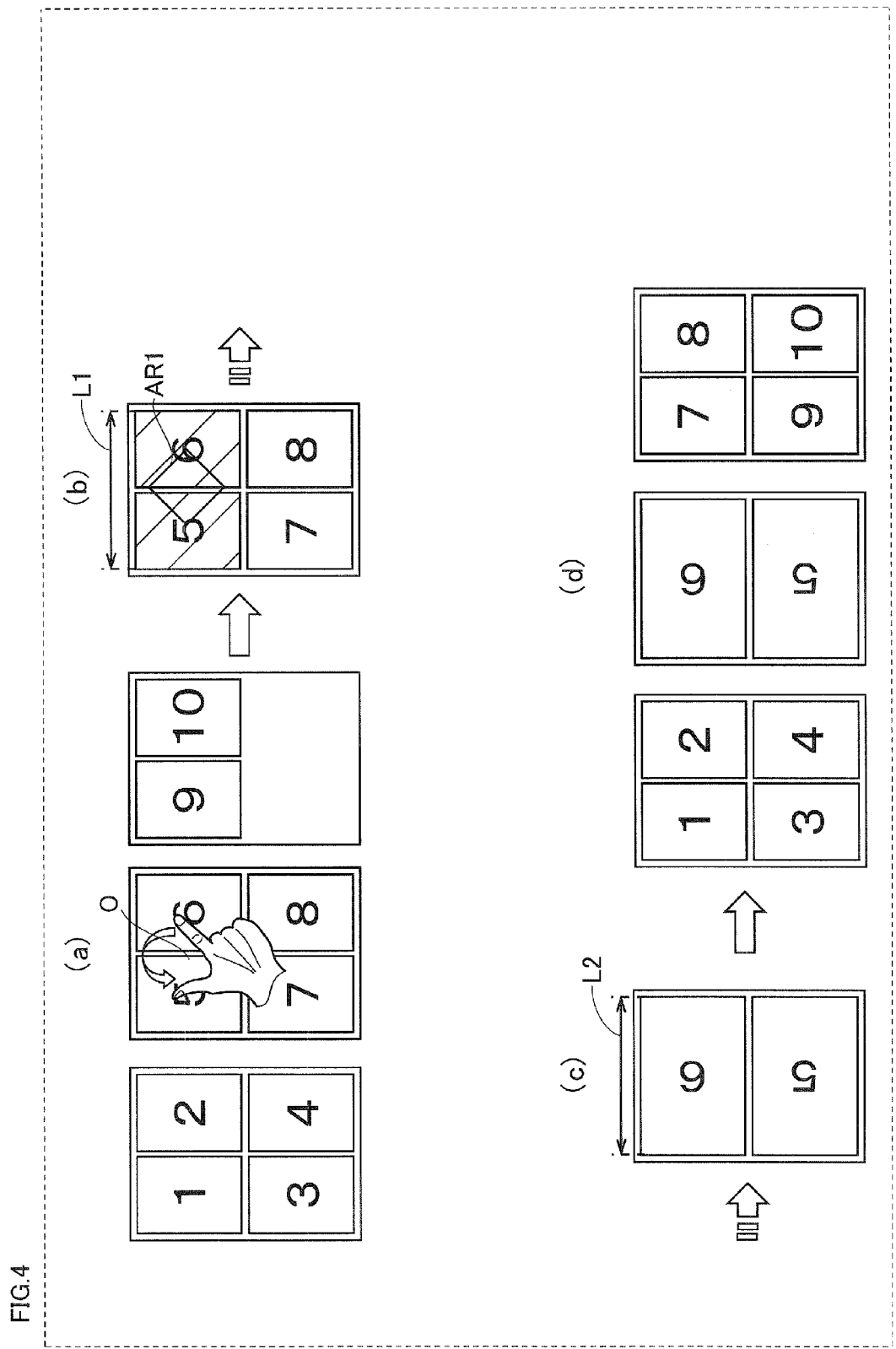
FIGS. 4 to 12 show behavior of image forming apparatus 1 in case that image forming apparatus 1 receives a first operation to a ninth operation in the embodiment of this invention.

FIG. 4 shows behavior of image forming apparatus 1 in case that image forming apparatus 1 receives a first operation in the embodiment of this invention. In FIGS. 4 to 12, the numerals of 1 to 10 accompanying the images mean the order number of the images. In FIGS. 4 to 12, the selected image may be hatched.

Referring to FIG. 4 (a), the first to fifth, the eighth and the ninth operations below are based on the premise of the following situations. Image forming apparatus 1 processes the file consists of 10 images. Image forming apparatus 1 allocates 4 images to each printing page (aggregates the 4 images on the 4 in 1 setting of printing) and displays the preview image of the 2nd printing page on display panel 101a. The 1st to 4th images are aggregated in the 1st printing page. The 5th to 8th images are aggregated in the 2nd printing page. The 9th and 10th images are aggregated in the 3rd printing page. The sizes of the images are constant. The preview image of the 2nd printing page may be displayed with the preview image of the 1st printing page. The preview image of the 2nd printing page may be displayed with the preview image of the 3rd printing page. The preview image of the 2nd printing page may be displayed with the preview images of the 1st and the 3rd printing pages.

As the first operation, a user executes a rotation operation in a counterclockwise direction on display panel 101a. The center of the rotation is the midpoint O between a starting point in the 5th image and a starting point in the 6th image of the 2nd printing page.

When receiving the operation, image forming apparatus 1 selects at least one of images from images allocated in the 2nd printing page based on the operation received. The sizes of the selected images are to be changed. As seen from FIG. 4 (b), image forming apparatus 1 identifies a rectangle area AR1 in which the diagonal straight line connects the two starting contact points of the rotation operation, and selects the 5th and 6th images (the shaded portion in the Figure) within the area. Image forming apparatus 1 may select images based on the two contact points before detecting a rotation operation.

If the point O as the center of the rotation does not move toward the 5th image which is the forward image in the selected images around the timing of the rotation operation, image forming apparatus 1 rotates the 5th and 6th images in the direction of the received operation (in the counterclockwise direction) 90 degrees as seen from FIG. 4 (c). Image forming apparatus 1 enlarges the 5th and 6th images. Image forming apparatus 1 enlarges each of the 5th and 6th images 1.41 times to make the size L2 and the size L1 equal, wherein the L2 is the size of the 5th and 6th images in the direction of the short side (in the direction of the short side of the printing page, in a horizontal direction of FIG. 4) after the rotation, and the L1 is the size of the 5th and 6th images in the direction of the long side before the rotation.

Image forming apparatus 1 adjusts the locations of the selected image and the following images. Image forming apparatus 1 adjusts the locations of the 5th and 6th images so that the 5th and 6th images are placed within the printing area of the 2nd printing page. Next, image forming apparatus 1 adjusts the locations of the 7th and the following images, as seen from FIG. 4 (d). More specifically, the 5th and 6th images were enlarged. Hence, the space for allocating the 7th and 8th images in the 2nd printing page disappears, wherein the 7th and 8th images which have the order numbers follow the 5th and 6th images were allocated to the 2nd printing page before the operation. In such a case, image forming apparatus 1 allocates the 7th and 8th images to the 3rd printing page. In consequence, the 5th and 6th images are aggregated in the 2nd printing page. The 7th to 10th images are aggregated in the 3rd printing page.

The positions and the sizes of the 1st to 4th images allocated to the 1st printing page which is anterior to the printing page received the first operation are maintained. Namely, the allocation state of the 1st printing page is maintained.

When receiving a rotation operation over 90 degrees, image forming apparatus 1 may rotate the selected image over 90 degrees, with 90 degrees increments in between, based on the rotation angle.

Figure 5:
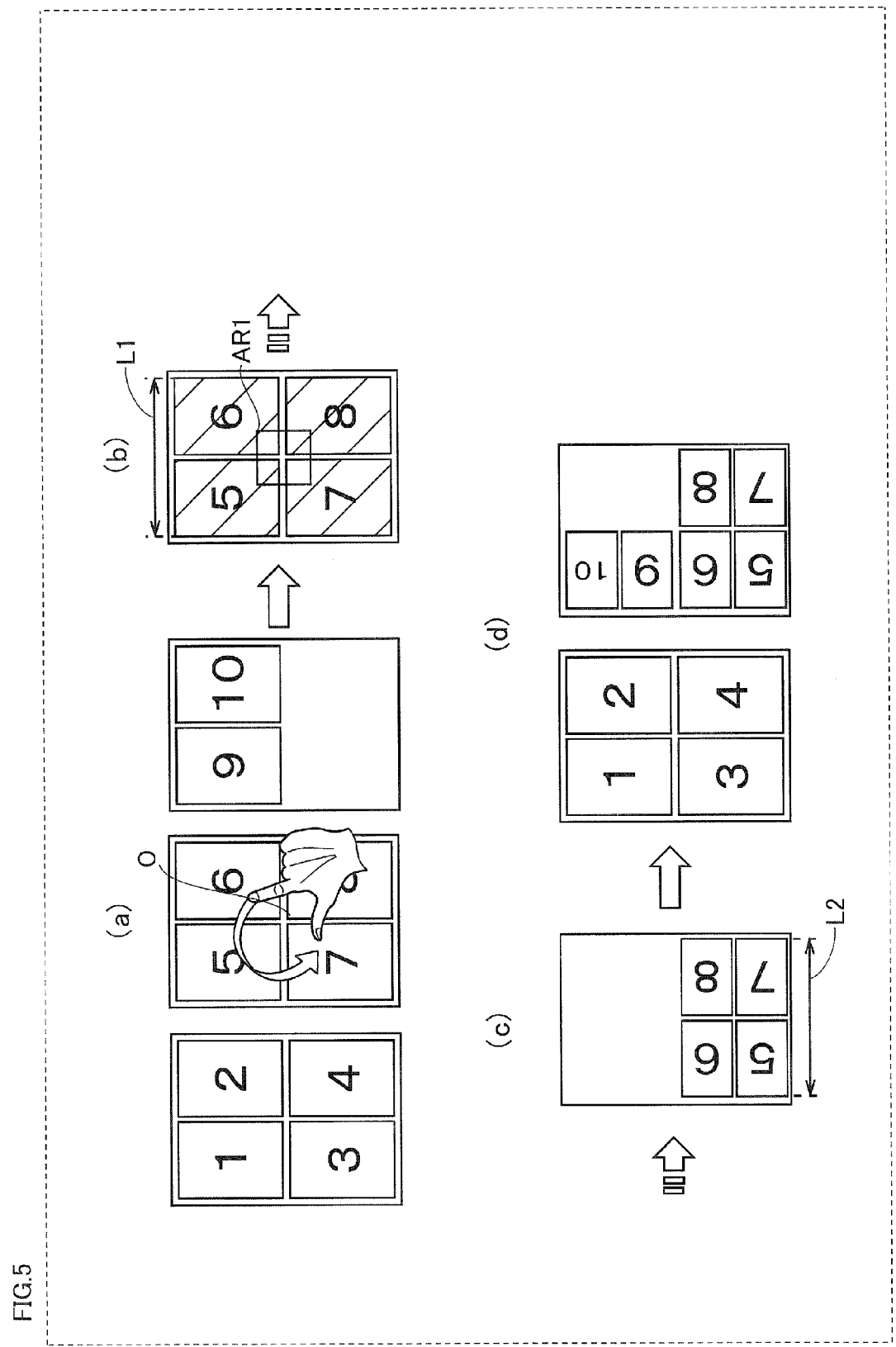

FIG. 5 shows behavior of image forming apparatus 1 in case that image forming apparatus 1 receives a second operation in the embodiment of this invention.

Referring to FIG. 5 (a), a user executes a rotation operation around on the midpoint O between a starting point in the 6th image and a starting point in the 7th image (or, between a starting point in the 5th image and a starting point in the 8th image) of the 2nd printing page in the counterclockwise direction on display panel 101a as the second operation.

When receiving the operation, image forming apparatus 1 selects images based on the operation received. As seen from FIG. 5 (b), image forming apparatus 1 identifies a rectangle area AR1 in which the diagonal straight line connects the two starting contact points of the rotation operation, and selects the 5th to 8th images (the shaded portion in the Figure) within the area.

Image forming apparatus 1 rotates the 5th to 8th images in the direction of the received operation (in the counterclockwise direction) 90 degrees as seen from FIG. 5 (c). Image forming apparatus 1 reduces the 5th to 8th images. Image forming apparatus 1 reduces each of 5th to 8th images 0.71 times to make the size L2 and the size L1 equal, wherein the L2 is the size of the 5th to 8th images in the direction of the long side (in a horizontal direction of FIG. 5) after the rotation, and the L1 is the size of the 5th to 8th images in the direction of the short side before the rotation.

Image forming apparatus 1 adjusts the locations of the selected images and the following images. Image forming apparatus 1 adjusts the locations of the 5th to 8th images so that the 5th to 8th images are placed in the lower part of the 2nd printing page after the rotation. Next, image forming apparatus 1 adjusts the locations of the 9th image and the following image, as seen from FIG. 5 (d). More specifically, the 5th to 8th images were reduced. Hence, the space being able to allocate images which have the same size as the reduced 5th to 8th images appears in the 2nd printing page. In such a case, image forming apparatus 1 reduces the 9th and 10th images at the same size as the reduced 5th to 8th images, and allocates them to the 2nd printing page. In consequence, the 5th to 10th images are aggregated in the 2nd printing page. The 3rd printing page which has no image to be allocated is deleted.

The locations and the sizes of the 1st to 4th images allocated in the 1st printing page anterior to the printing page received the second operation are maintained. Namely, the allocation state of the 1st printing page is maintained.

Image forming apparatus 1 may exhibit the behavior above only if the point O as the center of the rotation moved toward the forward images in the selected images around the timing of the rotation operation.

Figure 6:
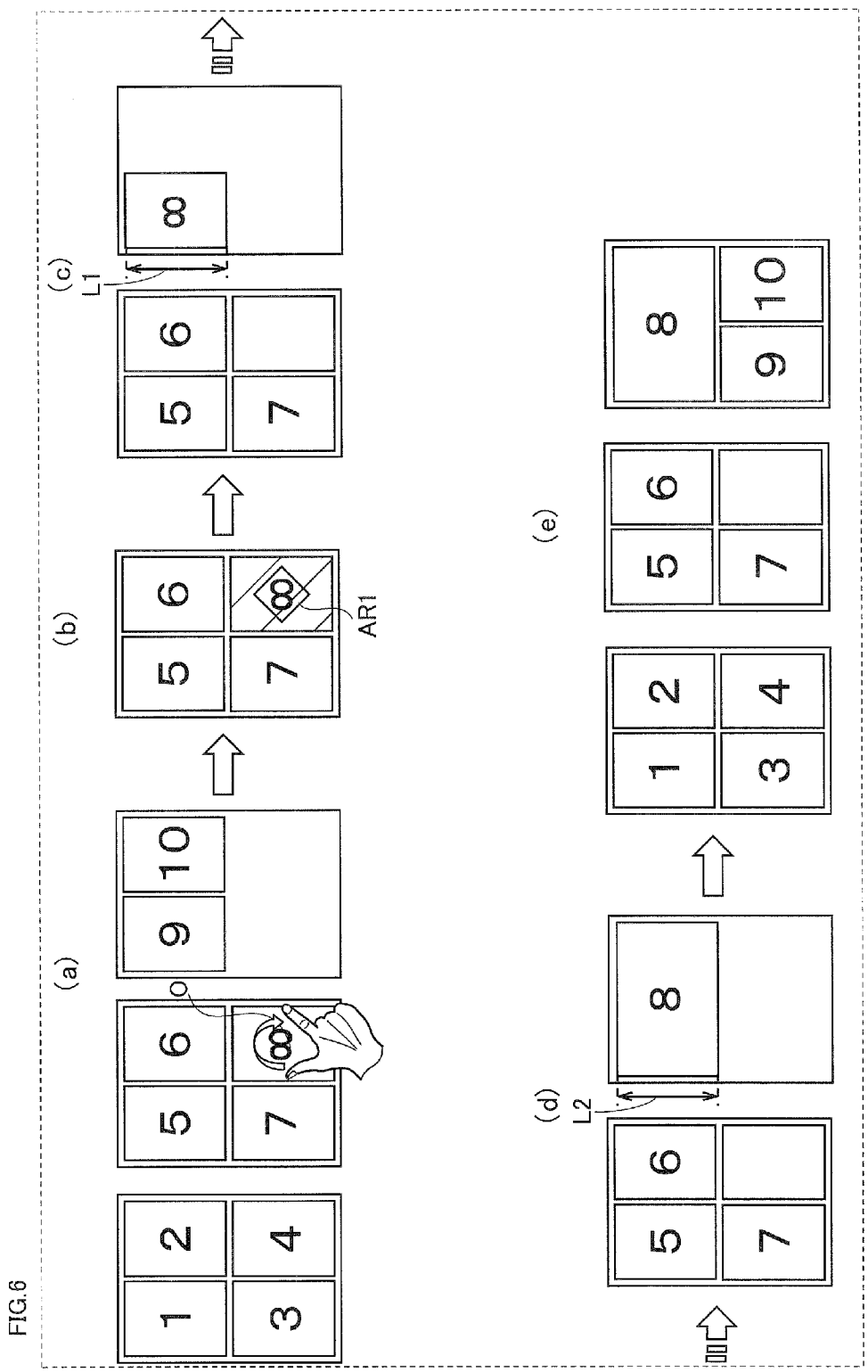

FIG. 6 shows behavior of image forming apparatus 1 in case that image forming apparatus 1 receives a third operation in the embodiment of this invention.

Referring to FIG. 6 (a), a user executes a rotation operation with the two starting points in the 8th image of the 2nd printing page in the clockwise direction on display panel 101a as the third operation.

When receiving the operation, image forming apparatus 1 selects an image based on the operation received. As seen from FIG. 6 (b), image forming apparatus 1 identifies a rectangle area AR1 in which the diagonal straight line connects the two starting contact points of the rotation operation, and selects the 8th image (the shaded portion in the Figure) within the area.

If the selected image is one image which has an even order number, image forming apparatus 1 inserts a blank image between the selected image and the image immediately anterior to the selected image. More specifically, as seen from FIG. 6 (c), image forming apparatus 1 inserts a blank image between the 8th image and the 7th image. In consequence, the space for allocating the 8th image disappears in the 2nd printing page. Image forming apparatus 1 allocates the 8th image to the 3rd printing page.

Image forming apparatus 1 rotates the 8th images in the direction of the received operation (in the clockwise direction) 90 degrees as seen from FIG. 6 (d). Image forming apparatus 1 enlarges the 8th image. Image forming apparatus 1 enlarges the 8th image 1.41 times to make the size L2 and the size L1 equal, wherein the L2 is the size of the 8th image in the direction of the short side (in the direction of the long side of the printing page, in a vertical direction of FIG. 6) after the rotation and the L1 is the size of the 8th image in the direction of the long side of the printing area before the rotation.

Image forming apparatus 1 adjusts the locations of the selected image and the following images. Image forming apparatus 1 adjusts the location of the 8th image so that the 8th image is placed in the upper part of the 3rd printing page after the rotation. Next, image forming apparatus 1 adjusts the locations of the 9th image and the following image, as seen from FIG. 6 (e). More specifically, the 8th image is allocated to the upper part of the 3rd printing page. Hence, image forming apparatus 1 allocates the 9th and 10th images to the lower part of the 3rd printing page. In consequence, the 5th to 7th images are aggregated in the 2nd printing page. The 8th to 10th images are aggregated in the 3rd printing page.

The locations and the sizes of the 1st to 4th images allocated to the 1st printing page anterior to the printing page received the second operation are maintained. Namely, the allocation state of the 1st printing page is maintained.

Figure 7:
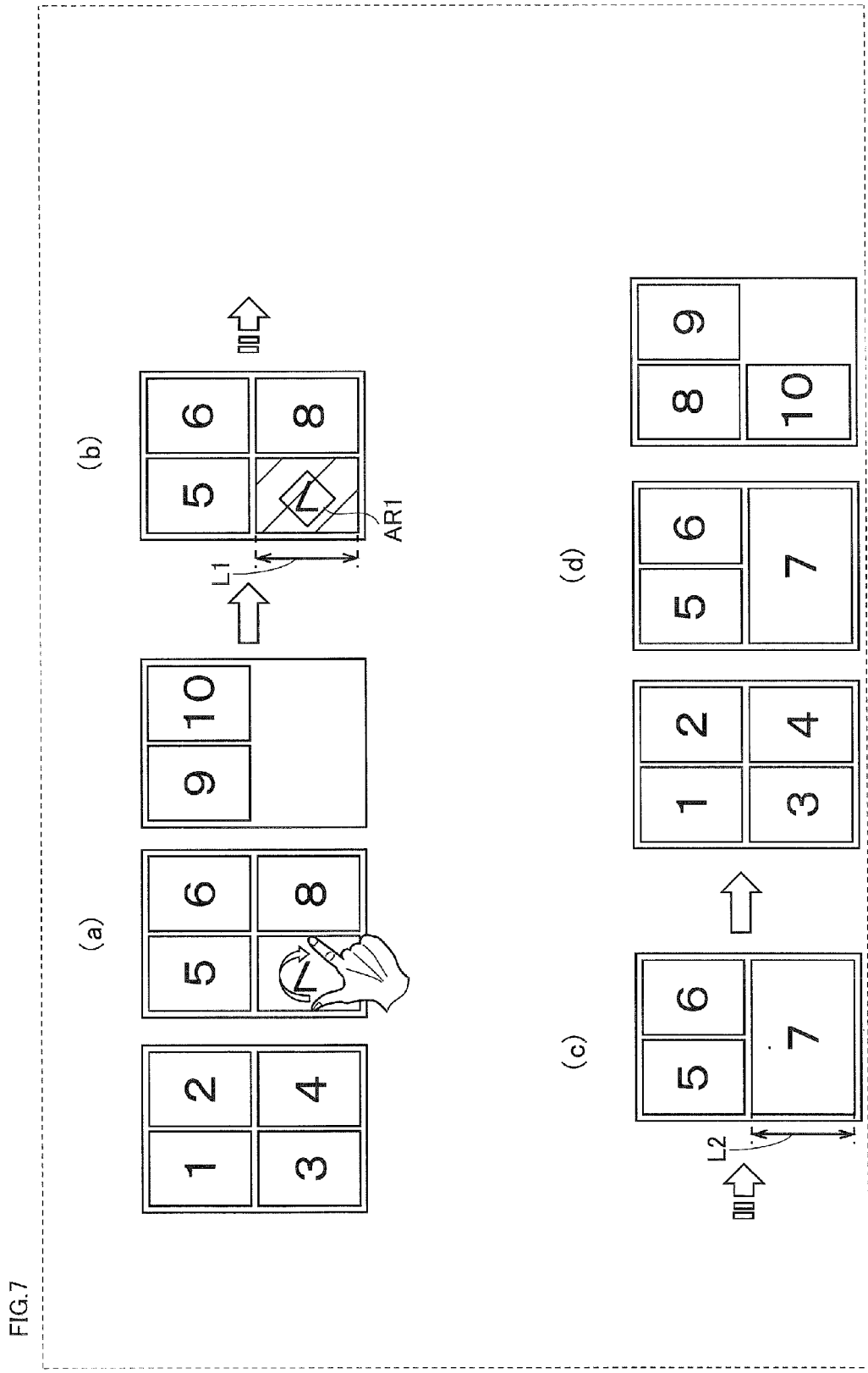

FIG. 7 shows behavior of image forming apparatus 1 in case that image forming apparatus 1 receives a fourth operation in the embodiment of this invention.

Referring to FIG. 7(a), a user executes a rotation operation with the two starting points in the 7th image of the 2nd printing page in the clockwise direction on display panel 101a as the third operation.

When receiving the operation, image forming apparatus 1 selects an image based on the operation received. As seen from FIG. 7 (b), image forming apparatus 1 identifies a rectangle area AR1 in which the diagonal straight line connects the two starting contact points of the rotation operation, and selects the 7th image (the shaded portion in the Figure) within the area.

If the selected image is one image which has an odd order number, image forming apparatus 1 rotates the 7th images selected in the direction of the received operation (in the clockwise direction) 90 degrees as seen from FIG. 7 (c). Image forming apparatus 1 enlarges the 7th image. A blank image is not inserted. Image forming apparatus 1 enlarges the 7th image 1.41 times to make the size L2 and the size L1 equal, wherein the L2 is the size of the 7th image in the direction of the short side (in a vertical direction of FIG. 7) after the rotation and the L1 is the size of the 7th image in the direction of the long side of the printing area before the rotation.

Image forming apparatus 1 adjusts the locations of the selected image and the following images. Image forming apparatus 1 adjusts the location of the 7th image so that the 7th image is placed in the lower part of the printing area of the 2nd printing page after the rotation. Next, image forming apparatus 1 adjusts the locations of the 8th image and the following images, as seen from FIG. 7 (d). More specifically, the 7th image was enlarged. Hence, the space for allocating the 8th image in the 2nd printing page disappears, wherein the 8th image which has the order number follows the 7th image was allocated in the 2nd printing page before the operation. In such a case, image forming apparatus 1 allocates the 8th image to the 3rd printing page. In consequence, the 5th to 7th images are aggregated in the 2nd printing page. The 8th to 10th images are aggregated in the 3rd printing page.

The locations and the sizes of the 1st to 4th images allocated to the 1st printing page anterior to the printing page received the fourth operation are maintained. Namely, the allocation state of the 1st printing page is maintained.

Figure 8:
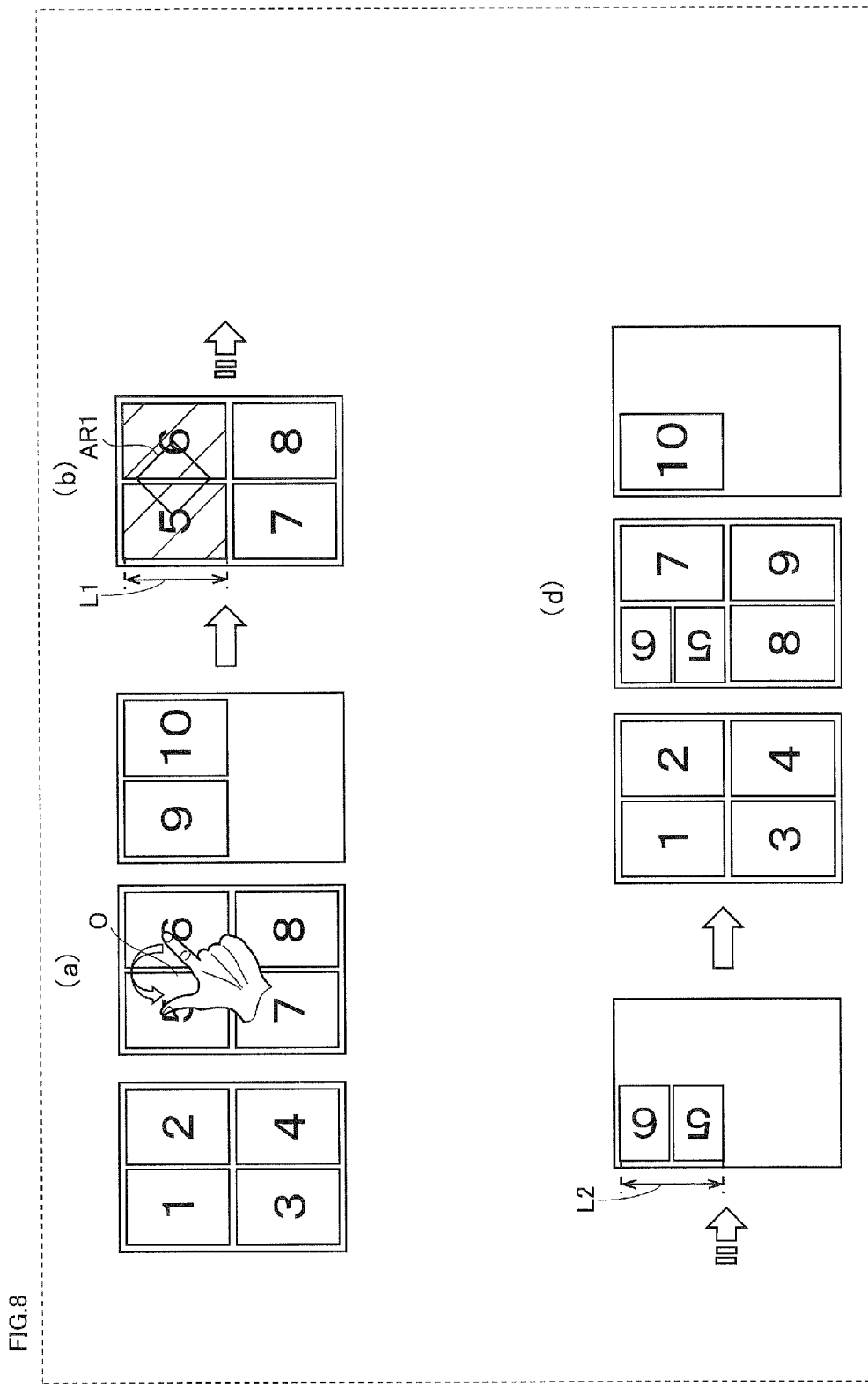

FIG. 8 shows behavior of image forming apparatus 1 in case that image forming apparatus 1 receives a fifth operation in the embodiment of this invention.

Referring to FIG. 8 (a), a user executes a rotation operation with the two starting points in the 5th and 6th images of the 2nd printing page around on the midpoint O between the starting points in the counterclockwise direction on display panel 101a as the fifth operation.

When receiving the operation, image forming apparatus 1 selects images based on the operation received. As seen from FIG. 8 (b), image forming apparatus 1 identifies a rectangle area AR1 in which the diagonal straight line connects the two starting contact points of the rotation operation, and selects the 5th and 6th images (the shaded portion in the Figure) within the area.

If the point O as the center of the rotation moves toward the 5th image which is the forward image in the selected images around the timing of the rotation operation, image forming apparatus 1 rotates the 5th and 6th images in the direction of the received operation (in the counterclockwise direction) 90 degrees as seen from FIG. 8 (c). Image forming apparatus 1 reduces the 5th and 6th images. Image forming apparatus 1 reduces each of 5th and 6th images 0.71 times to make the size L2 and the size L1 equal, wherein the L2 is the size of the 5th and 6th images in the direction of the long side (in a vertical direction of FIG. 8) after the rotation and the L1 is the size of the 5th and 6th images in the direction of the short side before the rotation.

Image forming apparatus 1 adjusts the locations of the selected image and the following images. Image forming apparatus 1 adjusts the locations of the 5th and 6th images so that the 5th and 6th images are placed in the upper left part of the printing area of the 2nd printing page after the rotation. Next, image forming apparatus 1 adjusts the locations of the 7th image and the following images, as seen from FIG. 8 (d). More specifically, the 5th and 6th images were reduced. Hence, the space at a location which 6th image was allocated before the reducing appears. In such a case, image forming apparatus 1 allocates the 9th image to the 2nd printing page with the 7th and 8th images. In consequence, the 5th to 9th images are aggregated in the 2nd printing page. The 10th image is placed in the 3rd printing page.

The locations and the sizes of the 1st to 4th images allocated to the 1st printing page anterior to the printing page received the fifth operation are maintained. Namely, the allocation state of the 1st printing page is maintained.

If the point O as the center of the rotation moves toward the forward image in the selected images through a distance equal to or more than the threshold value TH around the timing of the rotation operation, image forming apparatus 1 may reduce the selected images. In any other case, image forming apparatus 1 may enlarge the selected images. The threshold value TH is arbitrary and may set at the 50% value of the short side size of an image aggregated and displayed.

Figure 9:
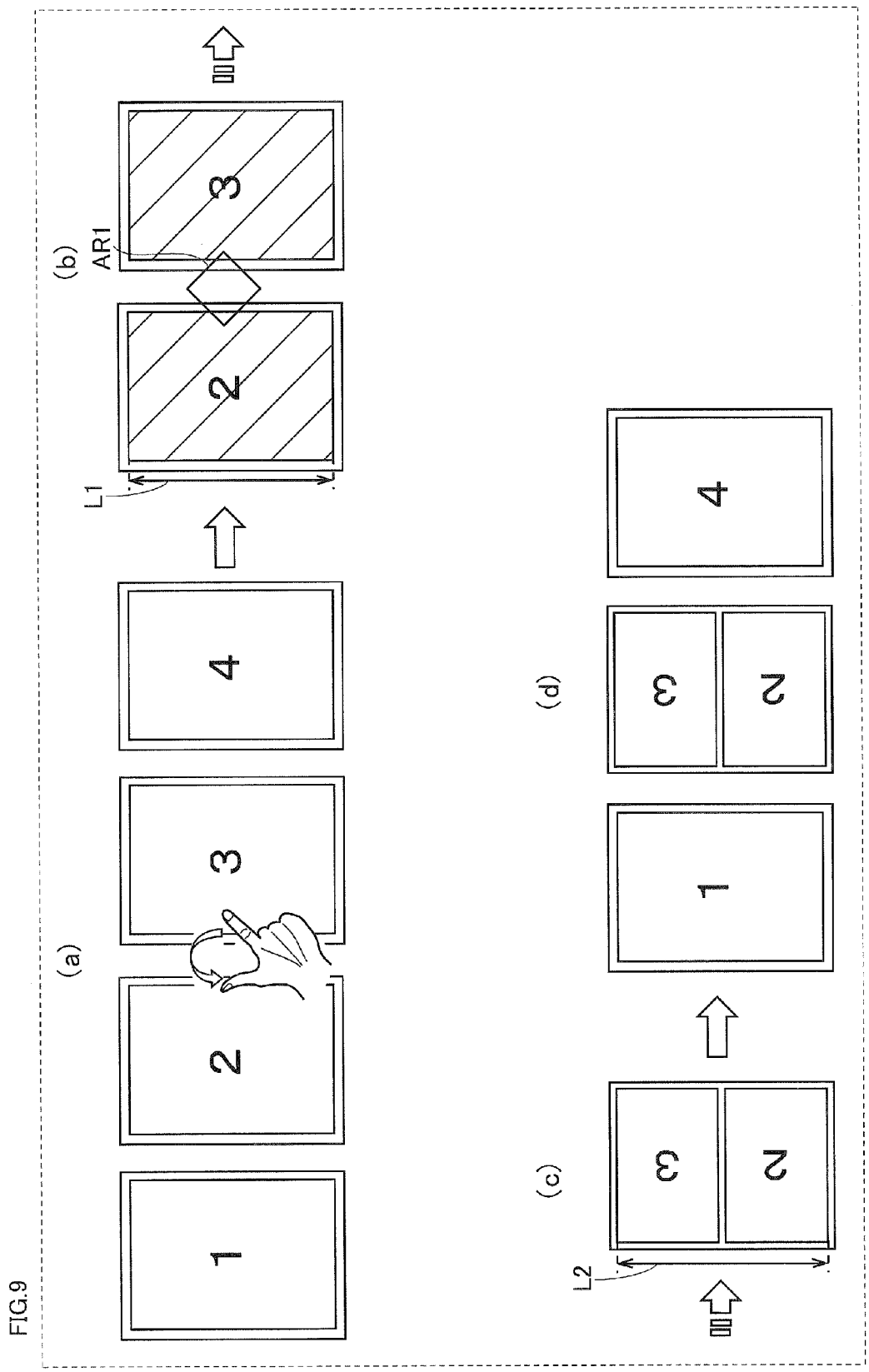

FIG. 9 shows behavior of image forming apparatus 1 in case that image forming apparatus 1 receives a sixth operation in the embodiment of this invention.

Referring to FIG. 9, the sixth and seventh operations below are based on the premise of the following situations. Image forming apparatus 1 processes the file consists of 4 images. Image forming apparatus 1 allocates an image to each printing page (aggregates the image on the 1 in 1 setting of printing) and displays the preview images of the 2nd and 3rd printing pages on display panel 101*a*. The 1st image is aggregated in the 1st printing page. The 2nd image is aggregated in the 2nd printing page. The 3rd image is aggregated in the 3rd printing page. The 4th image is aggregated in the 4th printing page. The sizes of the images are constant. The preview images of the 2nd and 3rd printing pages may be displayed with the preview image of the 1st printing page. The preview images of the 2nd and 3rd printing pages may be displayed with the preview image of the 4th printing page. The preview images of the 2nd and 3rd printing pages may be displayed with the preview images of the 1st and the 4th printing pages.

As the sixth operation, a user executes a rotation operation in a counterclockwise direction on display panel 101*a*. The center of the rotation is the midpoint O between a starting point in the 2nd image of the 2nd printing page and a starting point in the 3rd image of the 3rd printing page.

When receiving the operation, image forming apparatus 1 selects images based on the operation received. As seen from FIG. 9 (*b*), image forming apparatus 1 identifies rectangle area AR1 in which the diagonal straight line connects the two starting contact points of the rotation operation, and selects the 2nd and 3rd images (the shaded portion in the Figure) within the area.

If the point O as the center of the rotation moves toward the 2nd image which is the forward image in the selected images around the timing of the rotation operation, image forming apparatus 1 rotates the 2nd and 3rd images in the direction of the received operation (in the counterclockwise direction) 90 degrees as seen from FIG. 9 (*c*). Image forming apparatus 1 reduces the 2nd and 3rd images. Image forming apparatus 1 reduces each of 2nd and 3rd images 0.71 times to make the size L2 and the size L1 equal, wherein the L2 is the size of the 2nd and 3rd images in the direction of the long side (in a vertical direction of FIG. 9) after the rotation, and the L1 is the size of the 2nd and 3rd images in the direction of the long side before the rotation.

Image forming apparatus 1 adjusts the locations of the selected images and the following image. Image forming apparatus 1 adjusts the locations of the 2nd and 3rd images so that the 2nd and 3rd images are placed in the printing area of the 2nd printing page after the rotation. Next, image forming apparatus 1 adjusts the location of the 4th image, as seen from FIG. 9 (*d*). More specifically, the 2nd and 3rd images were reduced. Hence, the space at the location which the 3rd image was allocated in the 3rd printing page before the reducing appears. In such a case, image forming apparatus 1 allocates the 4th image to the 3rd printing page. In consequence, the 2nd and 3rd images are aggregated in the 2nd printing page. The 4th image is aggregated in the 3rd printing page.

The locations and the sizes of the 1st to 4th images allocated to the 1st printing page anterior to the printing page received the sixth operation are maintained. Namely, the allocation state of the 1st printing page is maintained.

Figure 10:
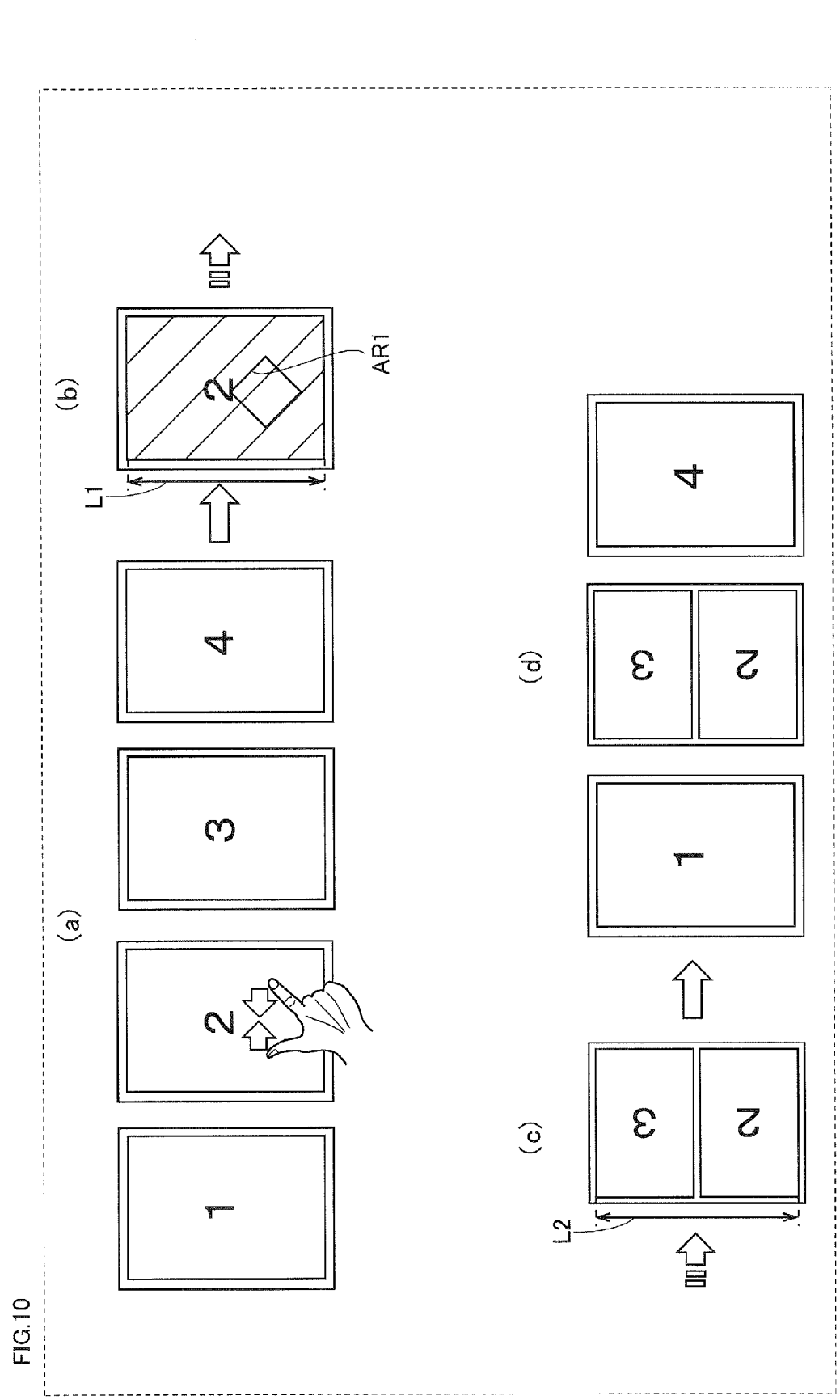

FIG. 10 shows behavior of image forming apparatus 1 in case that image forming apparatus 1 receives a seventh operation in the embodiment of this invention.

Referring to FIG. 10 (*a*), a user executes a pinch-in operation which is a gesture operation for moving two starting contact points in the 2nd image of the 2nd printing page on display panel 101*a* closer to each other as the seventh operation.

When receiving the operation, image forming apparatus 1 selects an image based on the operation received. As seen from FIG. 10 (*b*), image forming apparatus 1 identifies a rectangle area AR1 in which the diagonal straight line connects the two starting contact points of the pinch-in operation, and selects the 2nd image (the shaded portion in the Figure) within the area.

When image forming apparatus 1 selected the image and received the pinch-in operation, image forming apparatus 1 rotates the selected 2nd image and the following 3rd image in the counterclockwise or clockwise direction 90 degrees as seen from FIG. 10 (*c*). Image forming apparatus 1 reduces each of the 2nd and 3rd images 0.71 times to make the size L2 and the size L1 equal, wherein the L2 the size of the 2nd and 3rd images in the direction of the long side (in a vertical direction of FIG. 10) after the rotation, and the L1 is the size of the 2nd image in the direction of the long side before the rotation.

When an aggregation state of the printing page is the 2 in 1, for example, and the selected image has an even order number, image forming apparatus 1 may reduce the selected image and the image immediately anterior to the selected image. When the selected image has an odd order number, image forming apparatus 1 may reduce the selected image and the image immediately posterior to the selected image.

Image forming apparatus 1 adjusts the locations of the selected image and the following images. Image forming apparatus 1 adjusts the locations of the 2nd and 3rd images so that the 2nd and 3rd images are placed in the printing area of the 2nd printing page after the rotation. Next, image forming apparatus 1 adjusts the location of the 4th image, as seen from FIG. 10 (*d*). More specifically, the 2nd and 3rd images were reduced. Hence, the space is made in the 3rd printing page and the 4th image is aggregated in the 3rd printing page.

The location and the size of the 1st image allocated to the 1st printing page anterior to the printing page received the seventh operation are maintained. Namely, the allocation state of the 1st printing page is maintained.

Figure 11:
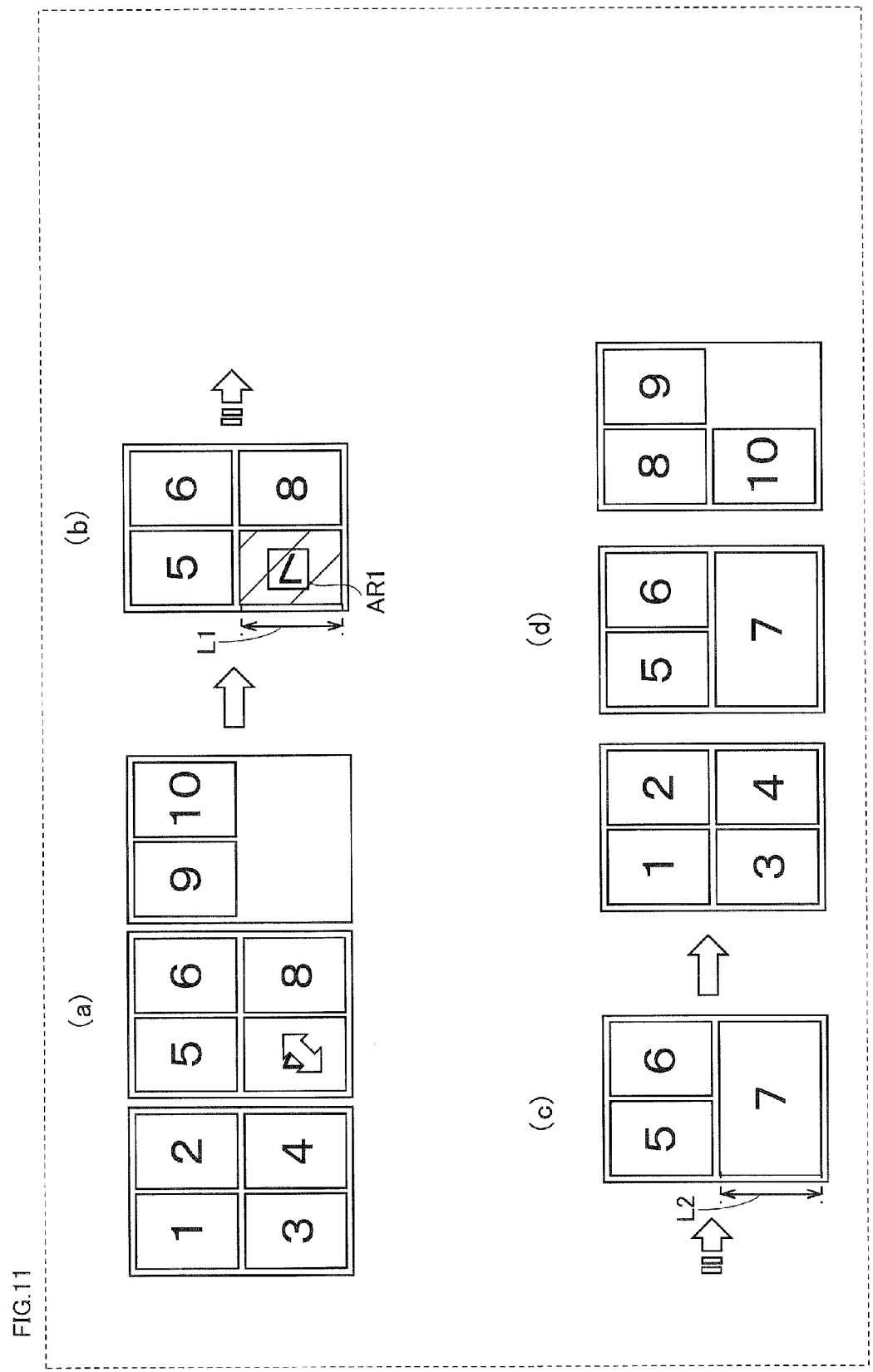

FIG. 11 shows behavior of image forming apparatus 1 in case that image forming apparatus 1 receives a eighth operation in the embodiment of this invention.

Referring to FIG. 11 (*a*), a user executes a pinch-out operation which is a gesture operation for moving two starting contact points in the 7th image of the 2nd printing page on display panel 101*a* away from each other as the eighth operation.

When receiving the operation, image forming apparatus 1 selects an image based on the operation received. As seen from FIG. 11 (*b*), image forming apparatus 1 identifies a rectangle area AR1 in which the diagonal straight line connects the two starting contact points of the pinch-out operation, and selects the 7th image (the shaded portion in the Figure) within the area.

When image forming apparatus 1 selected the image and received the pinch-out operation, image forming apparatus 1 rotates the selected 7th image in the counterclockwise or clockwise direction 90 degrees as seen from FIG. 11 (*c*). Image forming apparatus 1 enlarges the 7th images 1.41 times to make the size L2 and the size L1 equal, wherein the L2 is the size of the 7th image in the direction of the short side (in a vertical direction of FIG. 11) after the rotation, and the L1 is the size of the 7th image in the direction of the long side before the rotation.

In case that the selected image is an image which has an even order number, image forming apparatus 1 may insert a blank image between the selected image and the image immediately anterior to the selected image.

Image forming apparatus 1 adjusts the locations of the selected image and the following images. Image forming apparatus 1 adjusts the location of the 7th image so that the 7th image is placed in the lower part of the printing area of the 2nd printing page after the rotation. Next, image forming apparatus 1 adjusts the locations of the 8th image and the following images, as seen from FIG. 11 (*d*). More specifically, the 7th image was enlarged. Hence, the space for allocating the 8th image in the 2nd printing page disappears, wherein the 8th image which has an order numbers follows the 7th image was allocated in the 2nd printing page before the operation. In such a case, image forming apparatus 1 allocates the 8th image to the 3rd printing page. In consequence, the 5th to 7th images are aggregated in the 2nd printing page. The 8th to 10th images are aggregated in the 3rd printing page.

The locations and the sizes of the 1st to 4th images allocated to the 1st printing page anterior to the printing page received the eighth operation are maintained. Namely, the allocation state of the 1st printing page is maintained.

Figure 12:
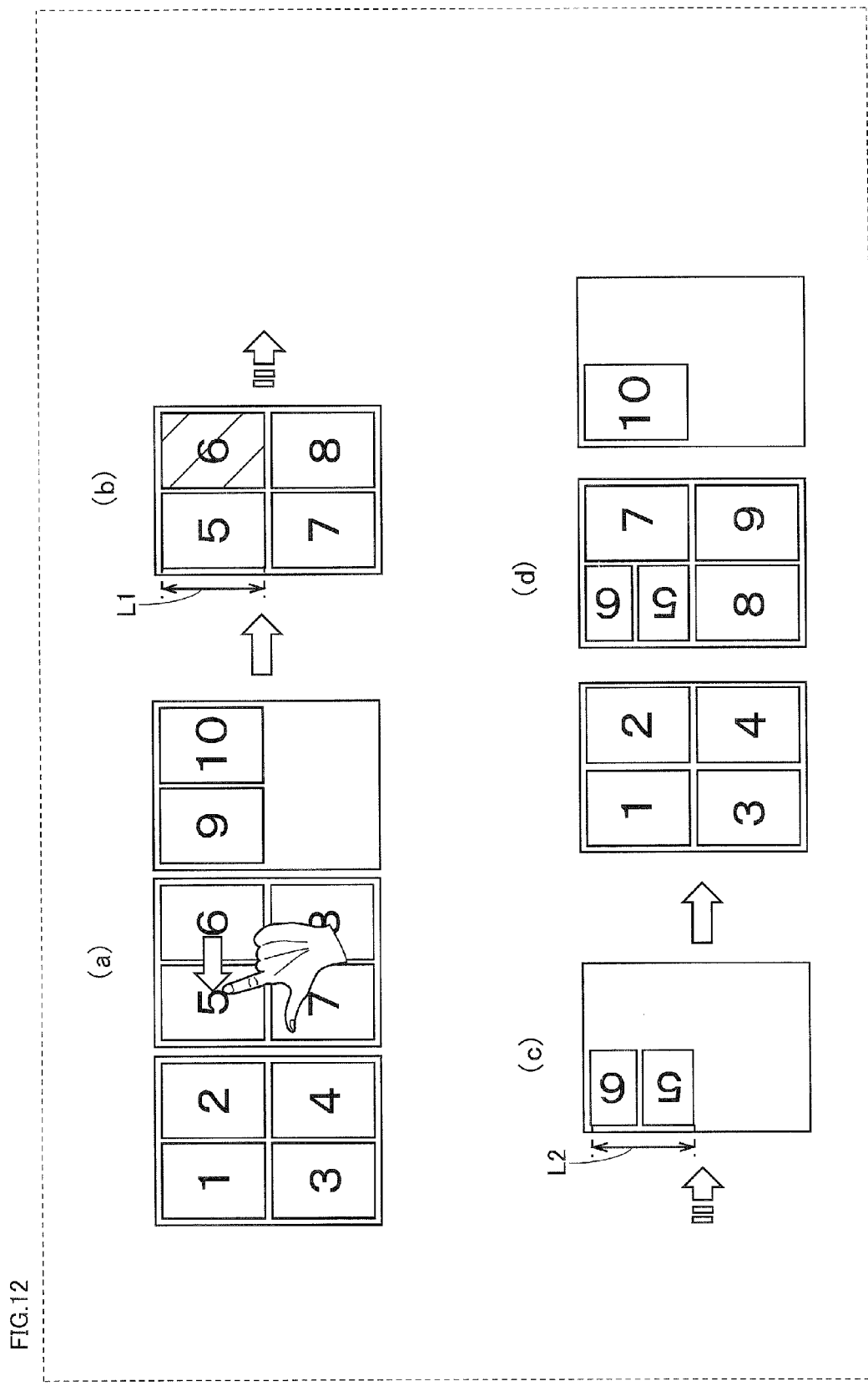

FIG. 12 shows behavior of image forming apparatus 1 in case that image forming apparatus 1 receives a ninth operation in the embodiment of this invention.

Referring to FIG. 12 (*a*), a user executes a drag operation which is a gesture operation for moving only a starting contact point in the 6th image of the 2nd printing page toward for example the 5th image (leftward direction in FIG. 12) on display panel 101*a* as a ninth operation.

When receiving the operation, image forming apparatus 1 selects an image based on the operation received. As seen from FIG. 12 (*b*), image forming apparatus 1 selects the 6th image (the shaded portion in the Figure) which was at the starting point of the drag operation.

When image forming apparatus 1 selected the image and received the drag operation which is a gesture operation for moving only one contact point with a display unit 101*a*, image forming apparatus 1 rotates the selected 6th image and the 5th image immediately anterior to the selected 6th image in the counterclockwise or clockwise direction 90 degrees as seen from FIG. 12 (*c*). Image forming apparatus 1 reduces the 5th and 6th images 0.71 times to make the size L2 and the size L1 equal, wherein the L2 is the size of the 5th and 6th images in the direction of the long side (in a vertical direction of FIG. 12) after the rotation, and the L1 is the size of the printing area of the 5th or 6th image in the direction of the short side before the rotation.

Image forming apparatus 1 adjusts the locations of the selected image and the following images. Image forming apparatus 1 adjusts the locations of the 5th and 6th images so that the 5th and 6th image is placed in the upper left part of the printing area of the 2nd printing page after the rotation. Next, image forming apparatus 1 adjusts the locations of the 7th image and the following images, as seen from FIG. 12 (*d*). More specifically, the 5th and 6th images were reduced. Hence, the space at a location which the 6th image was allocated before the reducing appears. In such a case, image forming apparatus 1 allocates the 9th image to the 2nd printing page with the 7th and 8th images. In consequence, the 5th to 9th images are aggregated in the 2nd printing page. The 10th image is aggregated in the 3rd printing page.

The locations and the sizes of the 1st to 4th images allocated to the 1st printing page anterior to the printing page received the ninth operation are maintained. Namely, the allocation state of the 1st printing page is maintained.

Figure 13:
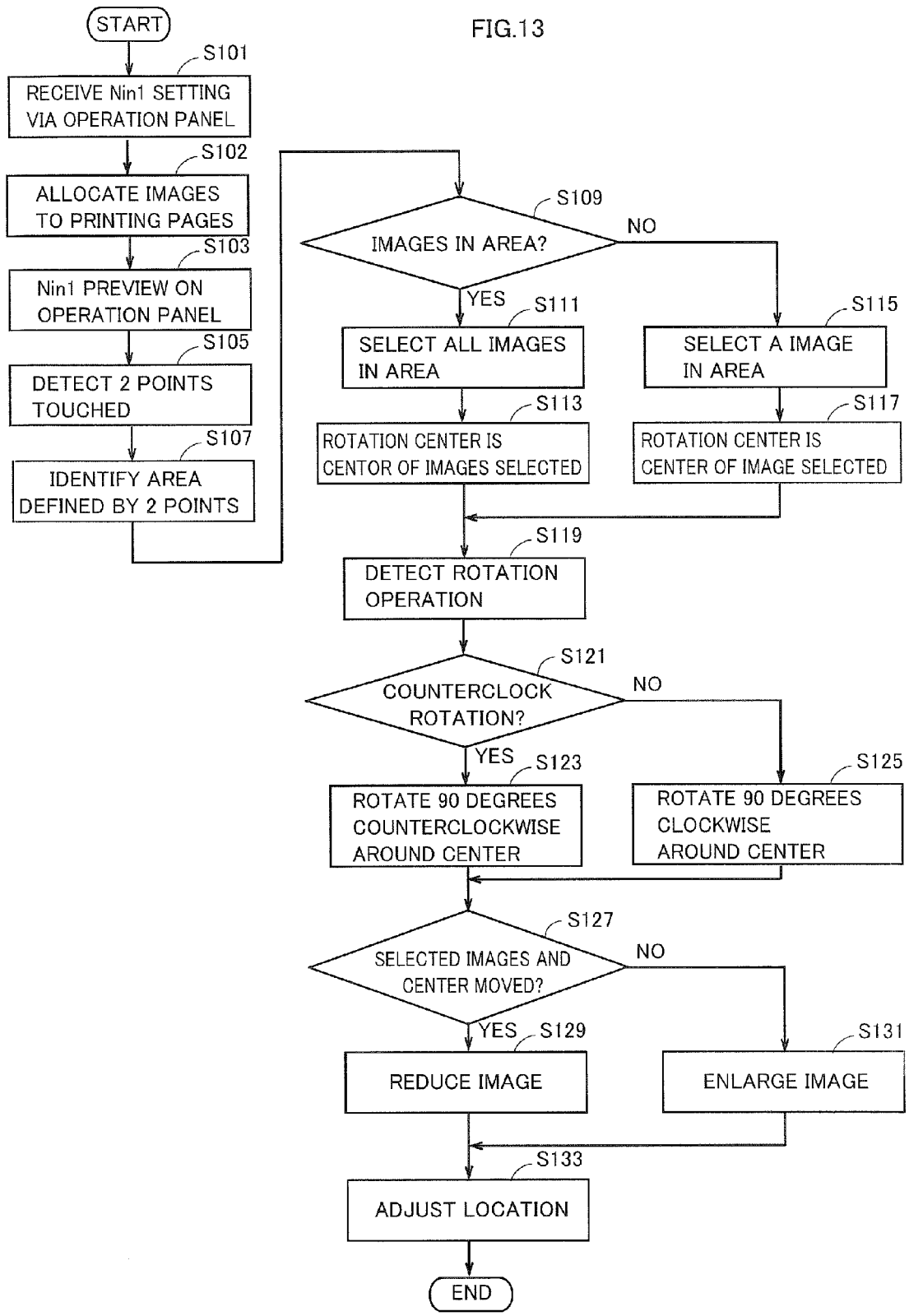
FIG. 13 shows a flowchart of behavior of image forming apparatus 1 in case that image forming apparatus 1 receives a rotation operation (any one of the first to sixth operations) when displaying a preview image.

FIG. 13 shows a flowchart of behavior of image forming apparatus 1 in case that image forming apparatus 1 receives a rotation operation (any one of the first to sixth operations) when displaying a preview image.

Referring to FIG. 13, when receiving a setting of the N in 1 printing for a file stored in a memory via operation panel 101 (S101), control unit 104 allocates images of the file to each of a plurality of printing pages (S102) and previews printing pages to which the images were allocated as the N in 1 printing on operation panel 101 (S103). In case that control unit 104 detects two contact points which are starting points of a rotation operation in the displayed printing page (S105), control unit 104 identifies the area defined by the two starting contact points (S107), and determines if there are a plurality of images in the area identified (S109).

At step S109, in case that control unit 104 determined there are a plurality of images in the area identified (YES at S109), control unit 104 selects all the images in the area (S111), sets the center of the selected images as the center of the rotation process (S113), and steps in the process of step S119.

At step S109, in case that control unit 104 determined there are not a plurality of images in the area identified (NO at S109), control unit 104 selects an image in the area (S115), sets the center of the selected image as the center of the rotation process (S117), and steps in the process of step S119.

At step S119, when a rotation operation is detected (S119), control unit 104 determines whether the rotation operation is in a counterclockwise direction or not (S121).

At step S121, in case that control unit 104 determines the rotation operation is in a counterclockwise direction (YES at S121), control unit 104 rotates the selected image around the set center in the counterclockwise direction 90 degrees (S123), and steps in step S127. On the other hand, at step S121, in case that control unit 104 determines the rotation operation is in a clockwise direction (NO at S121), control unit 104 rotates the selected image around the set center in the clockwise direction 90 degrees (S125), and steps in step S127.

At step S127, control unit 104 determines if the center of the rotation moves toward the forward image in the selected images (S127) in case that control unit 104 selects a plurality of images at step S111.

At step S127, if control unit 104 determines the center of the rotation moves toward the forward image in the selected images when control unit 104 selects a plurality of images (YES at S127), control unit 104 reduces the selected images to make the size of the selected images in the direction of the short side (X direction) or the long side (Y direction) after the rotation and the size of the printing area of the selected images in the direction of the short side or the long side before the rotation equal (S129), and steps in step S133.

At step S127, if control unit 104 determines the center of the rotation does not move toward the forward image in the selected images when control unit 104 selects a plurality of images, or control unit 104 determines only one image was selected (No at S127), control unit 104 enlarges the selected image(s) to make the size of the selected image(s) in the direction of the short side (X direction) or the long side (Y direction) after the rotation and the size of the printing area of the selected image(s) in the direction of the short side or the long side before the rotation equal (S131), and steps in step S133.

At step S133, control unit 104 adjusts the location of each of images (S133), and terminates the process.

Figure 14:
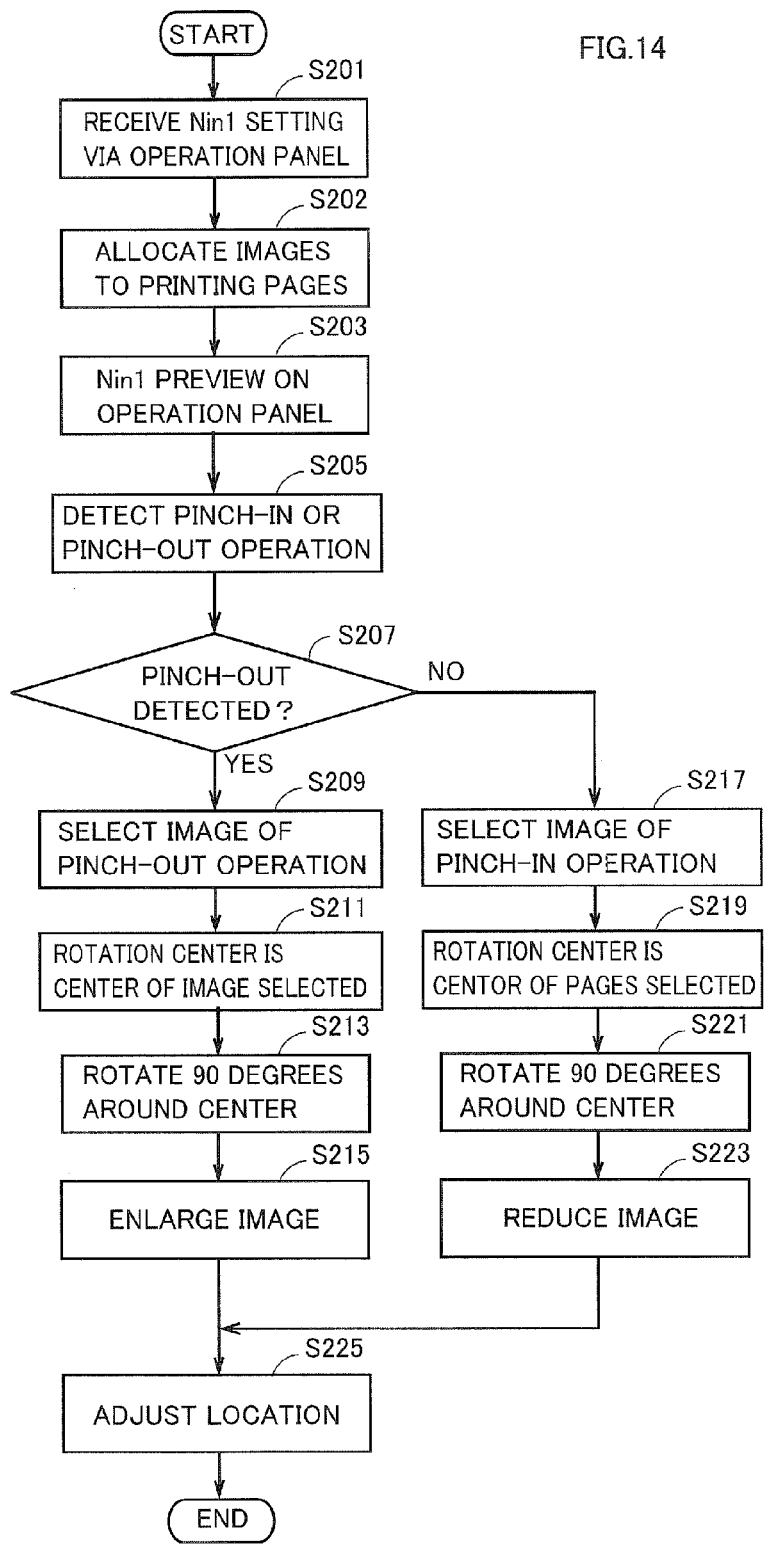
FIG. 14 shows a flowchart of behavior of image forming apparatus 1 in case that image forming apparatus 1 receives a pinch-in operation or a pinch-out operation (any one of the seventh and eighth operations) when displaying a preview image.

FIG. 14 shows a flowchart of behavior of image forming apparatus 1 in case that image forming apparatus 1 receives a pinch-in operation or a pinch-out operation (any one of the seventh and eighth operations) when displaying a preview image.

Referring to FIG. 14, when receiving a setting of the N in 1 printing for a file stored in a memory via operation panel 101 (S201), control unit 104 allocates images of the file to each of a plurality of printing pages (S202) and previews printing pages to which images are allocated as the N in 1 printing on operation panel 101 (S203). In case that control unit 104 detects a pinch-in operation or a pinch-out operation (S205), control unit 104 determines if the detected operation is a pinch-out operation or not (S207).

At step S207, if control unit 104 determines the detected operation is a pinch-out operation (YES at S207), control unit 104 selects the image of the object of the pinch-out operation (S209), sets the center of the rotation process as the center of the selected image (S211), and rotates the image around the set center 90 degrees (S213). Control unit 104 enlarges the selected image to make the size of the selected image in the direction of the short side (X direction) or the long side (Y direction) after the rotation and the size of the printing area of the selected image in the direction of the short side or the long side before the rotation equal (S215), and steps in step S225.

At step S207, if control unit 104 determines the detected operation is a pinch-in operation (NO at S207), control unit 104 selects the image of the object of the pinch-in operation (S217), sets the center of the rotation process as the center of the selected image (S219), and rotates the image around the set center 90 degrees (S221). Control unit 104 reduces the selected image to make the size of the selected image in the direction of the short side (X direction) or the long side (Y direction) after the rotation and the size of the printing area of the selected image in the direction of the short side or the long side before the rotation equal (S223), and steps in step S225.

At step S255, control unit 104 adjusts the location and the size of each of images (S255), and terminates the process.

Figure 15:
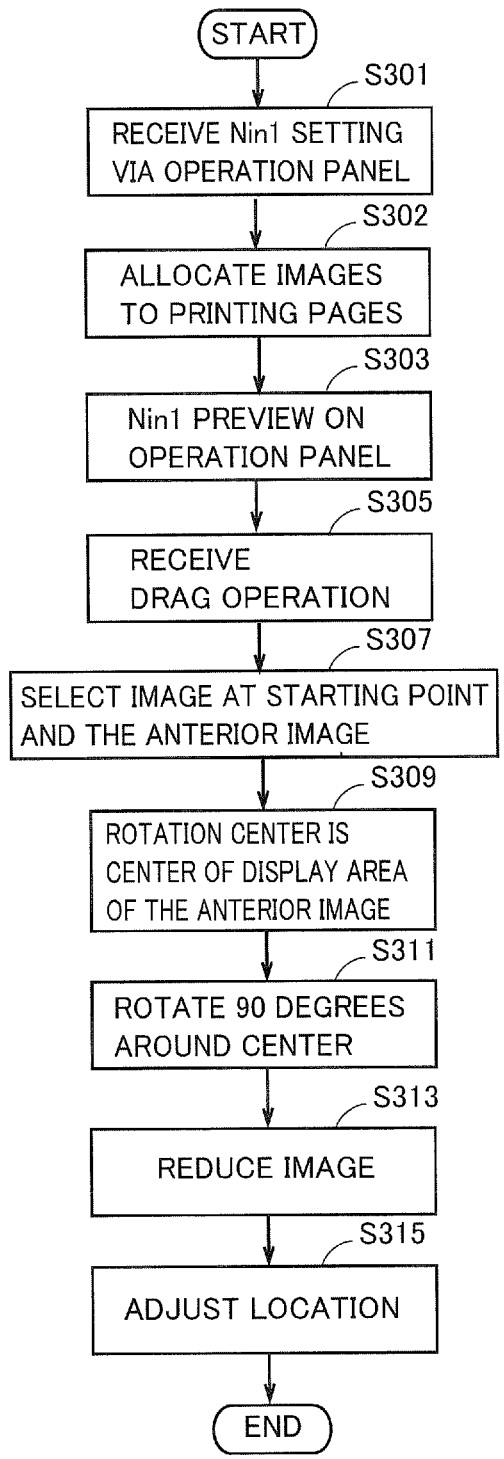
FIG. 15 shows a flowchart of behavior of image forming apparatus 1 in case that image forming apparatus 1 receives a drag operation (the ninth operation) when displaying a preview image.

FIG. 15 shows a flowchart of behavior of image forming apparatus 1 in case that image forming apparatus 1 receives a drag operation (the ninth operation) when displaying a preview image.

Referring to FIG. 15, when receiving a setting of the N in 1 printing for a file stored in a memory via operation panel 101 (S301), control unit 104 allocates images of the file to each of a plurality of printing pages (S302) and previews printing pages to which images are allocated as the N in 1 printing on operation panel 101 (S303). In case that control unit 104 detects a drag operation (S305), control unit 104 selects the image at the starting point of the drag operation and the anterior image (S307). Control unit 104 sets the center of the rotation process as the center of the displaying area of the image anterior to the image at which the drag operation starts (S309), and rotates the images around the set center 90 degrees (S311). Control unit 104 reduces the selected image to make the size of the selected image in the direction of the short side (X direction) or the long side (Y direction) after the rotation and the size of the printing area of the selected image in the direction of the short side or the long side before the rotation equal (S313), and terminates the process.

[Advantages of the Embodiments]

According to the above embodiments, a displaying device which improves the convenience can be provided.

According to the above embodiments, a user can change the allocation state of the arbitrary printing page by executing a gesture operation on a display panel when displaying a preview image to which the N in 1 printing is set on the display panel. In consequence, the user can change the allocation state of the target printing page partially by the instinctive operations. Hence, the convenience can be improved.

[Others]

A gesture operation received by a displaying device is not limited by a gesture operation in which two contact points moves. A displaying device may change the allocation state of at least one of the images corresponds to a gesture operation which moves three or more contact points, based on the gesture operation.

When a displaying device receives a gesture operation moves at least one of contact points with the starting point in a certain printing page on the display unit, the displaying device should maintain the allocation state of another printing page anterior to the certain printing page and change the allocation state of the another printing page. The behavior of the displaying device is not limited by the above embodiments receiving the first to ninth operations. A displaying device may change the state of the aggregation of the printing page each time a gesture operation is received, for example, the aggregation state of the 1 in 1, the aggregation state of the 2 in 1, the aggregation state of the 3 in 1, the aggregation state of the 4 in 1, . . . . A displaying device may execute a part of the actions (for example, only an action when receiving a rotation operation) corresponds to the first to ninth operations.

The processes described in the above embodiments can be executed by software or a hardware circuit. A computer program which executes the processes in the above embodiments can be provided. The program may be provided recorded in recording media of CD-ROMs, flexible disks, hard disks, ROMs, RAM, memory cards, or the like to users. The program is executed by a computer of a CPU or the like. The program may be downloaded to a device via communication lines like the internet.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A displaying device comprising:
   a display unit which is a touch panel type; and
   a processor;
   wherein the processor is configured to:
   allocate images to each of a plurality of printing pages;
   display a certain printing page among the plurality of printing pages on the display unit after the images are allocated;
   detect a gesture operation during which a plurality of contact points with the display unit moves with respect to the display unit, starting points of the plurality of contact points being in the certain printing page displayed on the display unit;
   change an allocation state of at least one of the images corresponding to the plurality of contact points, maintaining an allocation state of another one of the plurality of printing pages anterior to the certain printing page after the gesture operation is detected;

select at least one of the images out of the images allocated to the certain printing page based on the gesture operation detected by the processor; and rotate the image selected by the processor by 90 degrees and change the size of the image selected by the processor, wherein the processor inserts a blank image between the image selected by the processor and the image immediately anterior to the image selected by the processor in case that the processor selects an image having an even order number.

2. The displaying device according to claim 1, wherein the processor detects a gesture operation during which two of the plurality of contact points with the display unit move; and the processor selects the image within a rectangle area in which a diagonal straight line connects the two of the plurality of contact points.

3. The displaying device according to claim 1, wherein the processor allocates the image which follows the image selected by the processor and allocated to the certain printing page, to the printing page that follows the certain printing page, in case that the image selected by the processor was enlarged, and the space to which the image that follows the image selected by the processor is allocated disappears in the certain printing page.

4. The displaying device according to claim 1, wherein the processor allocates the image which follows the image selected by the processor and is allocated to the printing page that follows the certain printing page, to the certain printing page, in case that the image selected by the processor was reduced, and the space to which the image of the same size as the image selected by the processor after the reduction can be allocated appears in the certain printing page.

5. The displaying device according to claim 1, wherein the processor enlarges the image selected by the processor in case that the processor selects an image and the processor detects a pinch-out operation, the pinch-out operation being a gesture operation for moving two of the plurality of contact points with the display unit away from each other, and the processor reduces the image selected by the processor and the image immediately posterior to or immediately anterior to the image selected by the processor in case that the processor selects an image and the processor detects a pinch-in operation, the pinch-in operation being a gesture operation for moving two of the plurality of contact points with the display unit closer to each other.

6. The displaying device according to claim 1, wherein the processor reduces the image selected by the processor and the image immediately anterior to the image selected by the processor in case that the processor selects an image and the processor detects a drag operation, the drag operation being a gesture operation for moving only one of the plurality of contact points with the display unit.

7. A displaying device comprising:
a display unit which is a touch panel type; and
a processor;
wherein the processor is configured to:
allocate images to each of a plurality of printing pages;
display a certain printing page among the plurality of printing pages on the display unit after the images are allocated;

detect a gesture operation during which a plurality of contact points with the display unit moves with respect to the display unit, starting points of the plurality of contact points being in the certain printing page displayed on the display unit;

change an allocation state of at least one of the images corresponding to the plurality of contact points, maintaining an allocation state of another one of the plurality of printing pages anterior to the certain printing page after the gesture operation is detected;

select at least one of the images out of the images allocated to the certain printing page based on the gesture operation detected by the processor; and rotate the image selected by the processor by 90 degrees and change the size of the image selected by the processor, wherein the processor enlarges the image selected by the processor in case that the processor selects a plurality of images and detects a rotation operation, the rotation operation being a gesture operation to describe a circle using the two of the plurality of contact points with the display unit and the center of the rotation does not move toward the forward image out of the images selected by the processor around the timing of the rotation operation, and the processor reduces the image selected by the processor in case that the processor selects a plurality of images and detects a rotation operation, the rotation operation being a gesture operation to describe a circle using the two of the plurality of contact points with the display unit and the center of the rotation moves toward the forward image out of the images selected by the processor around the timing of the rotation operation.

8. A method of controlling a displaying device having a display unit which is a touch panel type comprising:
allocating images to each of a plurality of printing pages;
displaying a certain printing page among the plurality of printing pages on the display unit after the images are allocated;

detecting a gesture operation during which a plurality of contact points with the display unit moves with respect to the display unit, starting points of the plurality of contact points being in the certain printing page displayed on the display unit;

changing an allocation state of at least one of the images corresponding to the plurality of contact points, maintaining an allocation state of another one of the plurality of printing pages anterior to the certain printing page after the gesture operation is detected;

selecting at least one of the images out of the images allocated to the certain printing page based on the detected gesture operation;

rotating the selected image by 90 degrees and changing the size of the selected image; and inserting a blank image between the selected image and the image immediately anterior to the selected image in case that an image having an even order number is selected.

9. A non-transitory computer-readable recording medium encoded with a control program for a displaying device having a display unit which is a touch panel type, the control program causing a computer to execute:
allocating images to each of a plurality of printing pages;
displaying a certain printing page among the plurality of printing pages on the display unit after the images are allocated;

detecting a gesture operation during which a plurality of contact points with the display unit moves with respect to the display unit, starting points of the plurality of contact points being in the certain printing page displayed on the display unit;

changing an allocation state of at least one of the images corresponding to the plurality of contact points, maintaining an allocation state of another one of the plurality of printing pages anterior to the certain printing page after the gesture operation is detected;

selecting at least one of the images out of the images allocated to the certain printing page based on the detected gesture operation;

rotating the selected image by 90 degrees and changing the size of the selected image; and inserting a blank image between the selected image and the image immediately anterior to the selected image in case that an image having an even order number is selected.

10. A method of controlling a displaying device having a display unit which is a touch panel type comprising:

allocating images to each of a plurality of printing pages;

displaying a certain printing page among the plurality of printing pages on the display unit after the images are allocated;

detecting a gesture operation during which a plurality of contact points with the display unit moves with respect to the display unit, starting points of the plurality of contact points being in the certain printing page displayed on the display unit;

changing an allocation state of at least one of the images corresponding to the plurality of contact points, maintaining an allocation state of another one of the plurality of printing pages anterior to the certain printing page after the gesture operation is detected;

selecting at least one of the images out of the images allocated to the certain printing page based on the detected gesture operation;

rotating the selected image by 90 degrees and changing the size of the selected image;

enlarging the selected image in case that a plurality of images is selected and a rotation operation is detected, the rotation operation being a gesture operation to describe a circle using the two of the plurality of contact points with the display unit and the center of the rotation does not move toward the forward image out of the selected images around the timing of the rotation operation; and reduce the selected in case that a plurality of images is selected and a rotation operation is detected, the rotation operation being a gesture operation to describe a circle using the two of the plurality of contact points with the display unit and the center of the rotation moves toward the forward image out of the selected images around the timing of the rotation operation.

11. A non-transitory computer-readable recording medium encoded with a control program for a displaying device having a display unit which is a touch panel type, the control program causing a computer to execute:

allocating images to each of a plurality of printing pages;

displaying a certain printing page among the plurality of printing pages on the display unit after the images are allocated;

detecting a gesture operation during which a plurality of contact points with the display unit moves with respect to the display unit, starting points of the plurality of contact points being in the certain printing page displayed on the display unit;

changing an allocation state of at least one of the images corresponding to the plurality of contact points, maintaining an allocation state of another one of the plurality of printing pages anterior to the certain printing page after the gesture operation is detected;

selecting at least one of the images out of the images allocated to the certain printing page based on the detected gesture operation;

rotating the selected image by 90 degrees and changing the size of the selected image;

enlarging the selected image in case that a plurality of images is selected and a rotation operation is detected, the rotation operation being a gesture operation to describe a circle using the two of the plurality of contact points with the display unit and the center of the rotation does not move toward the forward image out of the selected images around the timing of the rotation operation; and reducing the selected in case that a plurality of images is selected and a rotation operation is detected, the rotation operation being a gesture operation to describe a circle using the two of the plurality of contact points with the display unit and the center of the rotation moves toward the forward image out of the selected images around the timing of the rotation operation.

* * * * *